Nov. 18, 1969   E. M. SMITH   3,478,915
SEAL WELD HAND HOLE COVER
Filed Nov. 15, 1967

INVENTOR.
ELLSWORTH M. SMITH
BY *Bosworth, Sessions,*
*Herrstrom + Cain*
ATTORNEYS United States Patent Office 3,478,915
Patented Nov. 18, 1969

3,478,915
SEAL WELD HAND HOLE COVER
Ellsworth M. Smith, Rocky River, Ohio, assignor to The Steel Improvement and Forge Company, Cleveland, Ohio, a corporation of Ohio
Filed Nov. 15, 1967, Ser. No. 683,211
Int. Cl. B65d 45/10, 49/00
U.S. Cl. 220—25       4 Claims

ABSTRACT OF THE DISCLOSURE

A hand hole cover of the seal weld type having a flange that engages the internal surface of the boiler or other pressure vessel with which it is used, the flange being curved to conform to the inner surface of the pressure vessel so that the need for machining a seat for the cover in the interior surface of the pressure vessel is eliminated.

BACKGROUND OF THE INVENTION

This invention relates to hand hole covers of the seal weld type for pressure vessels such as headers of high pressure boilers where hand holes are provided in order to give access to the interior of the headers. More particularly, the invention relates to elliptical, seal weld hand hole covers that have a flange that engages the interior of the pressure vessel to support the cover against the pressure within the vessel and in which the fluid seal is made by a welded joint between the cover and the exterior surface of the vessel.

Hand hole covers of this general type are well known and are used extensively in high pressure services. Heretofore, it has been the practice to provide hand hole covers of this type with plane flanges that engage the internal surface of the pressure vessel. The pressure vessels are usually cylindrical and therefore it has been necessary to machine a flat seat on the interior surface of the pressure vessel adjacent each elliptical opening that is to be closed by a hand hole cover in order to provide a flat surface to engage the flat flange of the cover.

Machining the seats in the interior of the vessel cuts away metal and weakens the vessel in the area immediately adjacent the hand holes and the machining operation is a difficult, time consuming and expensive one which adds substantially to the cost of the vessel.

SUMMARY OF THE INVENTION

A general object of the present invention is to provide hand hole covers of the seal weld type in which the above noted difficulties are eliminated and which require no machining or seats for the hand hole covers in the interior of the pressure vessel.

Briefly, this is accomplished in accordance with the present invention by providing the hand hole covers with flanges which conform to the curved interior surface of the pressure vessel with which they are to be used. Ordinarily the pressure vessels are cylindrical and therefore the flanges are forged to a cylindrical shape with a radius that is substantially the same as the radius of the cylindrical internal surface of the pressure vessels with which they are to be used.

BRIEF DESCRIPTION OF THE DRAWINGS

A preferred form of hand hole cover embodying the invention is shown in the drawings in which.

DESCRIPTION OF THE PREFERRED EMBODIMENTS

Figures 1, 2:
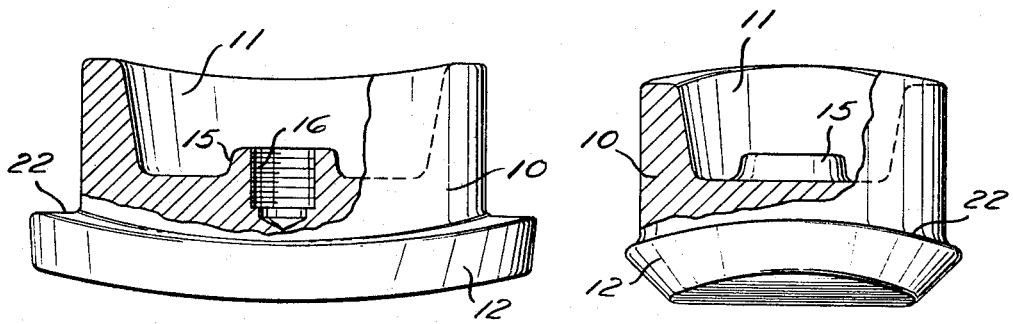
FIGURE 1 is a side elevational view with parts broken away of a hand hole cover embodying the invention.
FIGURE 2 is an end elevational view with parts broken away of the hand hole cover of FIGURE 1.

As shown in FIGURES 1 and 2, a hand hole cover made according to the invention comprises an imperforate body portion 10 having an interior recess 11 open at one end and a continuous projecting flange 12 at the other end. As is customary with hand hole covers of this type, the body portion and flange are elliptical in plan view so that the hand hole cover can be inserted into a pressure vessel V having an elliptical opening 13 of corresponding size which is to be closed by the cover. The cover is then rotated to a position in which the flange 12 underlies the inner surface 14 of the wall of the pressure vessel V in the region immediately surrounding the opening 13, as shown in FIGURES 3 and 4.

Figure 3:
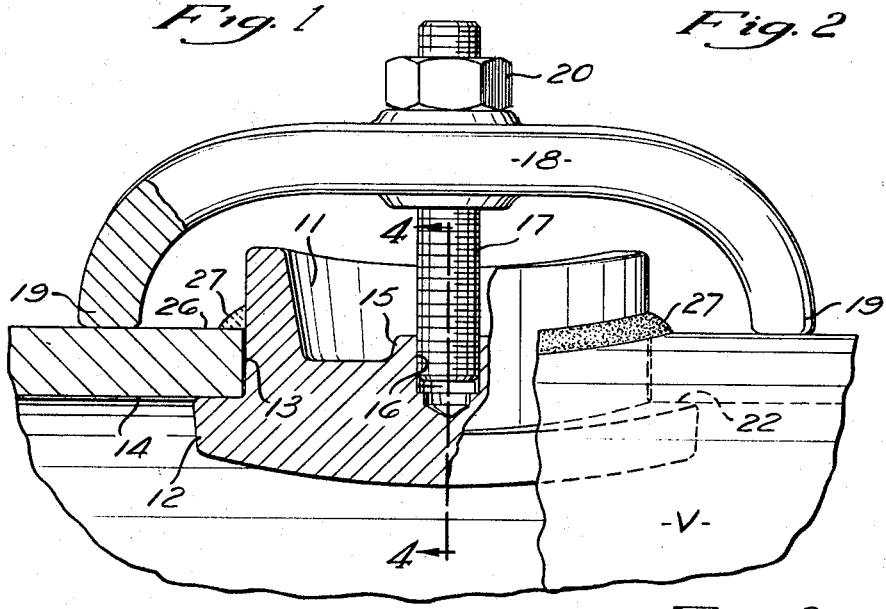
FIGURE 3 is a side view partially in section showing a portion of a pressure vessel with a hand hole cover made according to the invention in position, parts of the hand hole cover also being broken away.
Figure 4:
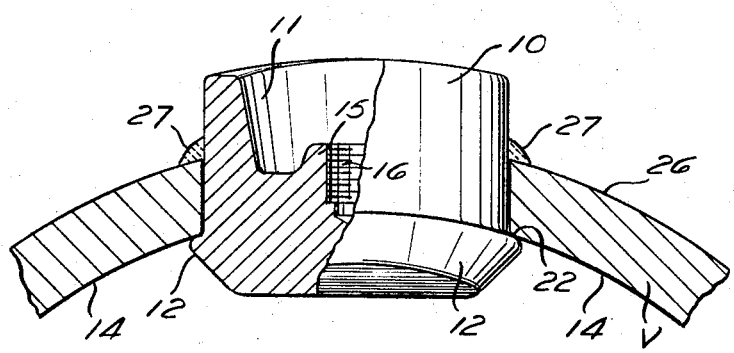
FIGURE 4 is a transverse sectional view, taken as indicated by line 4—4 of FIGURE 3.

In order to provide for ease of handling the hand hole cover and for retaining it in position during a subsequent welding operation, the cover is provided with a central boss 15 that has an internally threaded opening 16 to receive a threaded stud 17, as shown in FIGURE 3. The hand hole cover can be held in place within the pressure vessel V in the manner shown in FIGURE 3 by means of a yoke 18 that has a central aperture through which the stud 17 projects and ends 19 that engage the exterior surface of the pressure vessel V. By tightening a nut 20 on the stud 17 the hand hole cover can be held securely in place as shown in FIGURE 3 with the upper surface 22 of the flange 12 in engagement with the inner surface 14 of the pressure vessel in the region immediately surrounding the opening 13.

Heretofore, in hand hole covers of this general type plane flanges have been employed; therefore, as noted above, an expensive machining operation has been required to provide a seat for the hand hole cover flange in the interior of the pressure vessel adjacent the opening therethrough. According to the present invention this expensive operation is eliminated by forming the hand hole cover, preferably by forging, so that the upper surface 22 of the flange 12 conforms to the curved inner surface of the vessel. In the present example, the surface 22 is cylindrical to conform to the circular cylindrical inner surface of the pressure vessel V. That is, the upper surface 22 of the hand hole cover is so shaped that any element of that surface lying parallel to the axis of the cylindrical pressure vessel V and parallel to the major axis of the elliptical opening 13 is a straight line while any element of the surface 22 that extends transversely of the major axis of the hand hole cover and of the axis of the pressure vessel is given a cylindrical curvature having a radius substantially equal to the radius of the inner surface 14 of the pressure vessel V. With this construction, when a hand hole cover embodying the present invention is correctly positioned in a pressure vessel as shown in FIGURES 3 and 4 the surface 22 makes contact throughout substantially its entire area with the inner surface 14 of the pressure vessel V in the zone immediately surrounding the opening 13 through which the body 10 of the hand hole cover extends. The hand hole cover is thus firmly and accurately supported against mechanical displacement by the internal pressure within the pressure vessel. This is accomplished without requiring any machining of the pressure vessel and the concomitant expense and weakening of the wall of the vessel.

The contact between the upper surface 22 of the flange 12 and the inner surface 14 of the vessel is not sufficient to provide a fluid seal nor is it intended to be. Instead, the fluid seal is provided by welding the outer surface of the body 10 to the surrounding outer surface 26 of the pressure vessel, the weld being shown at 27 in FIGURES 3 and 4. The welding operation is carried out with the hand hole cover secured in position by the stud 17, the yoke 18 and the nut 20 as shown in FIGURE 3, but after the weld has been completed the nut, yoke and stud can be removed leaving the assembly as shown in FIGURE 4.

From the foregoing description, it will be evident that I have provided an improved hand hole cover of the seal weld type which can be manufactured at reasonable cost and installed readily. The cover does not require any machining or other treatment of the interior surface of the pressure vessels with which it is used. The hand hole covers are mechanically strong and are retained against the internal pressure of the pressure vessel by the engagement of their flanges 12 with the interior surface of the vessel while the possibility of leakage of fluid is eliminated by welding the bodies 10 of the hand hole covers to the outer surface of the pressure vessel. When it is desired to remove the hand hole covers from a pressure vessel, the covers are supported by a yoke and stud as shown in FIGURE 3 and the weld material chipped or burned away. The covers are particularly adapted for use with hand holes of elliptical shape ranging in size from two and one-half inches (minor axis) by three and one-half inches (major axis) to six inches (minor axis) by eight inches (major axis), but the invention may be adapted to openings of different sizes and proportions.

Those skilled in the art will appreciate that various changes and modifications can be made in the preferred form of the invention disclosed herein and without departing from the spirit and scope of the invention. The essential characteristics of the invention are defined in the appended claims.

I claim:
1. A cover for closing an opening in the wall of a metal pressure vessel having a curved inner surface, said cover comprising an imperforate metal body portion having a flange at one end thereof, the cover being insertable into the pressure vessel through the opening and being arranged to be disposed in the opening with the body portion projecting through the opening and beyond the outer surface of the pressure vessel, the cover and the outer surface of the pressure vessel having contiguous surfaces adapted to be welded together to provide a fluid seal, the flange of the cover having a surface that is curved to conform to the curved inner surface of the wall of the vessel to retain the cover in position against internal fluid pressure, substantially the entire area of said surface of the flange being in contact with the curved inner surface of the wall of the vessel immediately adjacent the opening.

2. A cover according to claim 1 wherein the body portion and flange of the cover are generally elliptical and curvilinear throughout the perimeter thereof and the opening in the pressure vessel is also elliptical and curvilinear throughout the perimeter thereof.

3. A cover according to claim 2 wherein said surface of the flange is cylindrical to conform to the inner surface of the wall of a cylindrical pressure vessel.

4. A cover according to claim 3 having a recess in the body portion, a threaded opening in the recess, a stud removably threaded in the opening, and a yoke removably mounted on the stud and having portions adapted to engage the outer surface of the pressure vessel to temporarily support the cover in the opening in the pressure vessel.

References Cited

UNITED STATES PATENTS

| | | | |
|---|---|---|---|
| 2,520,864 | 8/1950 | Thornhill | 220—25 |
| 3,094,238 | 6/1963 | Davidson | 220—25 |

JAMES B. MARBERT, Primary Examiner